United States Patent
Li et al.

(10) Patent No.: US 12,374,152 B2
(45) Date of Patent: Jul. 29, 2025

(54) MACHINE-VISION PERSON TRACKING IN SERVICE ENVIRONMENT

(71) Applicant: Microsoft Technology Licensing, LLC, Redmond, WA (US)

(72) Inventors: Chenyang Li, Bellevue, WA (US); Hongli Deng, Bellevue, WA (US); Gabriel Blanco Saldana, Kirkland, WA (US); Joseph Milan Filcik, Redmond, WA (US); Ryan Savio Menezes, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 17/454,786

(22) Filed: Nov. 12, 2021

(65) Prior Publication Data
US 2023/0154224 A1 May 18, 2023

(51) Int. Cl.
*G06V 40/10* (2022.01)

(52) U.S. Cl.
CPC ................... *G06V 40/103* (2022.01)

(58) Field of Classification Search
CPC ...... G06V 40/103; G06V 20/10; G06V 20/52; G06V 20/53; G06V 10/147; G06V 20/40; G06V 40/10; G06V 10/22; G06V 10/225; G06V 10/62; G06V 20/54; G06V 20/49; G06T 2207/10016; G06T 2207/30196; G06T 2207/30242; G06T 7/70; G06T 2207/30232; G06T 7/20; G06T 2200/24; G06T 2207/20021; G06T 2207/20081; G06T 2207/20104; G06T 7/11; G06T 7/246; G06T 7/248; G06T 7/277; G06Q 30/0201; G06Q 10/02; G06Q 10/063; G06Q 30/0255

See application file for complete search history.

(56) References Cited

U.S. PATENT DOCUMENTS

| 9,892,371 B1 | 2/2018 | Cronin | |
| 10,180,321 B2 * | 1/2019 | Allocco | G01C 11/04 |
| 10,515,277 B2 * | 12/2019 | Gyger | G06V 20/53 |

(Continued)

OTHER PUBLICATIONS

Bae, et al., "Robust Online Multi-object Tracking Based on Tracklet Confidence and Online Discriminative Appearance Learning", In Proceedings of IEEE Conference on Computer Vision and Pattern Recognition, Jun. 23, 2014, pp. 1218-1225.

(Continued)

*Primary Examiner* — Michael S Osinski

(74) *Attorney, Agent, or Firm* — Alleman Hall & Tuttle LLP

(57) ABSTRACT

A method to predict a traversal-time interval for traversal of a service queue comprises receiving video of a region including the service queue, recognizing in the video, via machine vision, a plurality of persons awaiting service within the region, estimating an average crossing-time interval between successive crossings, by the plurality of persons, of a fixed boundary along the service queue, wherein such estimating is based on features of the service queue and of the one or more persons awaiting service, and returning an estimate of the traversal-time interval based on a count of the persons awaiting service and on the average crossing-time interval as estimated.

19 Claims, 9 Drawing Sheets

(56) References Cited

U.S. PATENT DOCUMENTS

| | | | |
|---|---|---|---|
| 10,521,673 B2* | 12/2019 | Takeda | G06V 40/10 |
| 10,796,138 B2* | 10/2020 | Takemoto | G06Q 30/0201 |
| 10,902,441 B2* | 1/2021 | Klima | G06Q 10/06 |
| 11,250,644 B2* | 2/2022 | Westmacott | G06V 20/54 |
| 11,675,617 B2* | 6/2023 | Herring | G06F 9/4881 |
| | | | 718/103 |
| 11,825,240 B2* | 11/2023 | Blott | H04N 7/181 |
| 2009/0296989 A1* | 12/2009 | Ramesh | G06V 20/52 |
| | | | 382/103 |
| 2010/0027875 A1* | 2/2010 | Hampapur | G06V 40/103 |
| | | | 382/159 |
| 2010/0284568 A1* | 11/2010 | Tojo | G06V 40/167 |
| | | | 382/103 |
| 2011/0273312 A1 | 11/2011 | Eggleton et al. | |
| 2013/0223678 A1 | 8/2013 | Brunetti | |
| 2015/0208015 A1* | 7/2015 | Takahashi | H04N 21/4316 |
| | | | 348/159 |
| 2015/0345942 A1* | 12/2015 | Allocco | G06V 20/52 |
| | | | 382/103 |
| 2015/0379434 A1 | 12/2015 | Argue et al. | |
| 2016/0005053 A1 | 1/2016 | Klima et al. | |
| 2016/0191865 A1 | 6/2016 | Beiser et al. | |
| 2016/0192149 A1 | 6/2016 | Zises | |
| 2016/0224844 A1* | 8/2016 | Gyger | G06V 20/53 |
| 2016/0259980 A1* | 9/2016 | Mlybari | G06T 7/277 |
| 2016/0350615 A1* | 12/2016 | Yano | G06V 20/53 |
| 2018/0060672 A1 | 3/2018 | Takeda | |
| 2018/0350179 A1 | 12/2018 | Yamashita et al. | |
| 2019/0102612 A1* | 4/2019 | Takemoto | G06Q 30/0201 |
| 2019/0377959 A1* | 12/2019 | Marano | G06Q 50/40 |
| 2019/0392222 A1* | 12/2019 | Westmacott | G06V 20/49 |
| 2020/0005066 A1* | 1/2020 | Iwamoto | G06T 7/215 |
| 2020/0193662 A1* | 6/2020 | Juangbhanich | G06T 7/254 |
| 2020/0327561 A1 | 10/2020 | Klima et al. | |
| 2021/0032822 A1* | 2/2021 | Balogh | E01F 13/022 |
| 2021/0034877 A1* | 2/2021 | Druihle | G06V 40/103 |
| 2021/0097298 A1 | 4/2021 | Xu et al. | |
| 2021/0104110 A1 | 4/2021 | Rogener | |
| 2021/0134101 A1 | 5/2021 | Galley et al. | |
| 2021/0287374 A1* | 9/2021 | Bamba | G06T 7/10 |
| 2022/0051026 A1* | 2/2022 | Singh | G06T 7/20 |
| 2022/0114371 A1* | 4/2022 | Stewart | G06V 20/52 |
| 2022/0292286 A1* | 9/2022 | Subramanian | G06T 7/277 |
| 2022/0327720 A1* | 10/2022 | Verwoerd | G06T 7/593 |
| 2023/0064953 A1* | 3/2023 | Iwai | G06V 10/22 |
| 2023/0154192 A1* | 5/2023 | Zu | G06V 20/52 |
| | | | 382/103 |
| 2024/0119822 A1* | 4/2024 | Jayaraman | G06V 20/52 |

OTHER PUBLICATIONS

Kuplyakov, et al., "A Distributed Tracking Algorithm for Counting People in Video by Head Detection", In Proceedings of the 30th International Conference on Computer Graphics and Machine Vision, Dec. 31, 2020, 12 Pages.

Mamedov, et al., "Queue Waiting Time Estimation Using Person Re-identification by Upper Body", Retrieved From: https://ceur-ws.org/Vol-3027/paper47.pdf, Sep. 30, 2021, 11 Pages.

"International Search Report and Written Opinion Issued in PCT Application No. PCT/US22/043560", Mailed Date: Jan. 2, 2023, 13 Pages.

Rajvanshi, et al., "Queue Time Estimation in Checkout Counters Using Computer Vision and Deep Neural Network", In Journal of Physics: Conference Series, vol. 1964, Issue 6, Jul. 31, 2021, 9 Pages.

Carvalho, et al., "Predicting Waiting Time in Customer Queuing Systems", In Proceedings of IEEE International Conference on Knowledge Engineering and Applications, Sep. 28, 2016, pp. 155-159.

Gonclaves, et al., "Crowdsourcing Queue Estimations in Situ", In Proceedings of the 19th ACM Conference on Computer-Supported Cooperative Work & Social Computing, Feb. 27, 2016, 12 Pages.

* cited by examiner

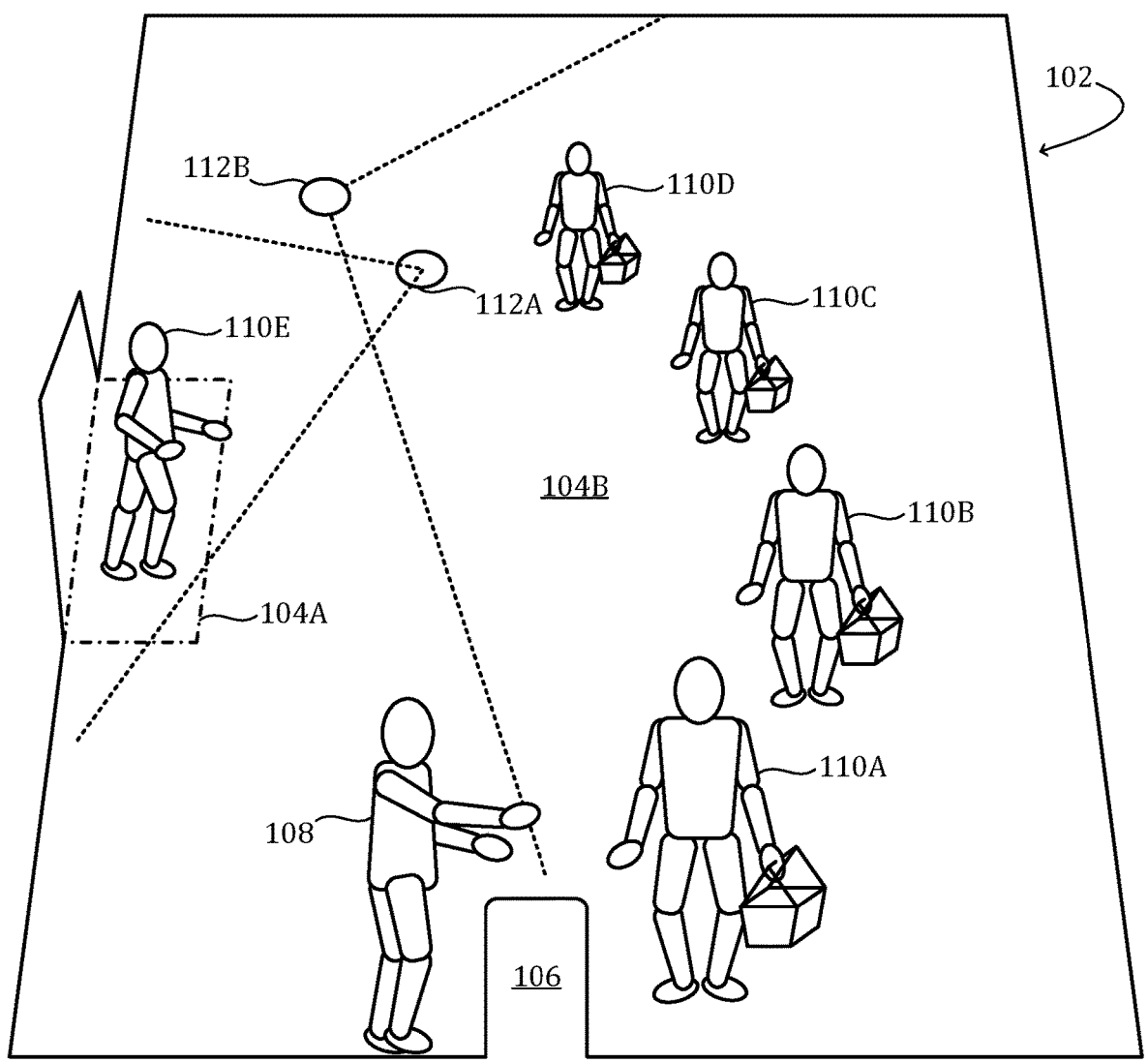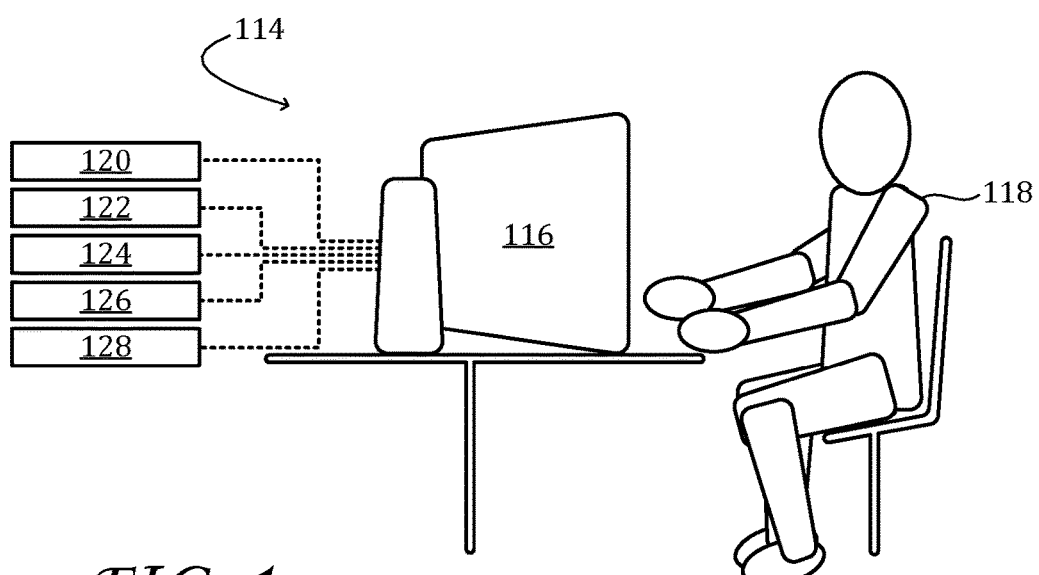
FIG. 1

MACHINE-VISION PERSON TRACKING IN SERVICE ENVIRONMENT

BACKGROUND

A service queue is a familiar feature of human society in general and of retail commerce in particular. Retail customers typically dislike the experience of waiting a long time in a service queue. Accordingly, the longer the service queue the more likely a customer is to seek comparable service elsewhere. In many scenarios a retail manager may be able to take measures to shorten a service queue so as to maintain customer satisfaction. Such measures may include keeping employees in reserve and activating the reserve employees to provide customer service when the average wait time in the service queue exceeds a threshold.

SUMMARY

One aspect of this disclosure relates to a method to predict a traversal-time interval for traversal of a service queue. The method comprises receiving video of a region including the service queue and recognizing in the video, via machine vision, a plurality of persons awaiting service within the region. The method further comprises estimating an average crossing-time interval between successive crossings, by the plurality of persons, of a fixed boundary along the service queue, wherein such estimating is based on features of the service queue and of the plurality of persons awaiting service, and returning an estimate of the traversal-time interval based on a count of the persons awaiting service and on the average crossing-time interval as estimated.

Another aspect of this disclosure relates to a method to detect advance of a person through a region. The method comprises receiving video of the region, updating a model of the region based on the video, and defining in the model a series of candidate boundaries within the region. For each candidate boundary a confidence is assessed for recognizing the person on a first side of the candidate boundary in a first frame of the video and on a second, opposite side of the candidate boundary in a second, subsequent frame of the video. The method further comprises identifying the candidate boundary for which the confidence is highest, and signaling the advance pursuant to recognizing, above a threshold confidence, that the person is on the first side of the identified candidate boundary in the first frame of the video and on the second side of the identified candidate boundary in the second frame of the video.

Another aspect of this disclosure relates to a computer system comprising a hardware interface, a machine-vision engine, and a detection engine. The hardware interface is configured to receive video of a region. The machine-vision engine is configured to update a model of the region based on the video. The detection engine is configured to define a series of candidate boundaries within the region and, for each candidate boundary of the series, assess a confidence of recognizing a person on a first side of a candidate boundary in a first frame of the video and on a second, opposite side of the candidate boundary in a second, subsequent frame of the video. The detection engine is further configured to identify the candidate boundary for which the confidence is highest and signal the advance of the person across the region pursuant to recognizing, above a threshold confidence, that the person is on the first side of the identified candidate boundary in the first frame of the video and on the second side of the identified candidate boundary in the second frame of the video.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIG. 1 shows aspects of an example service environment and monitor station.

DETAILED DESCRIPTION

Figure 2:
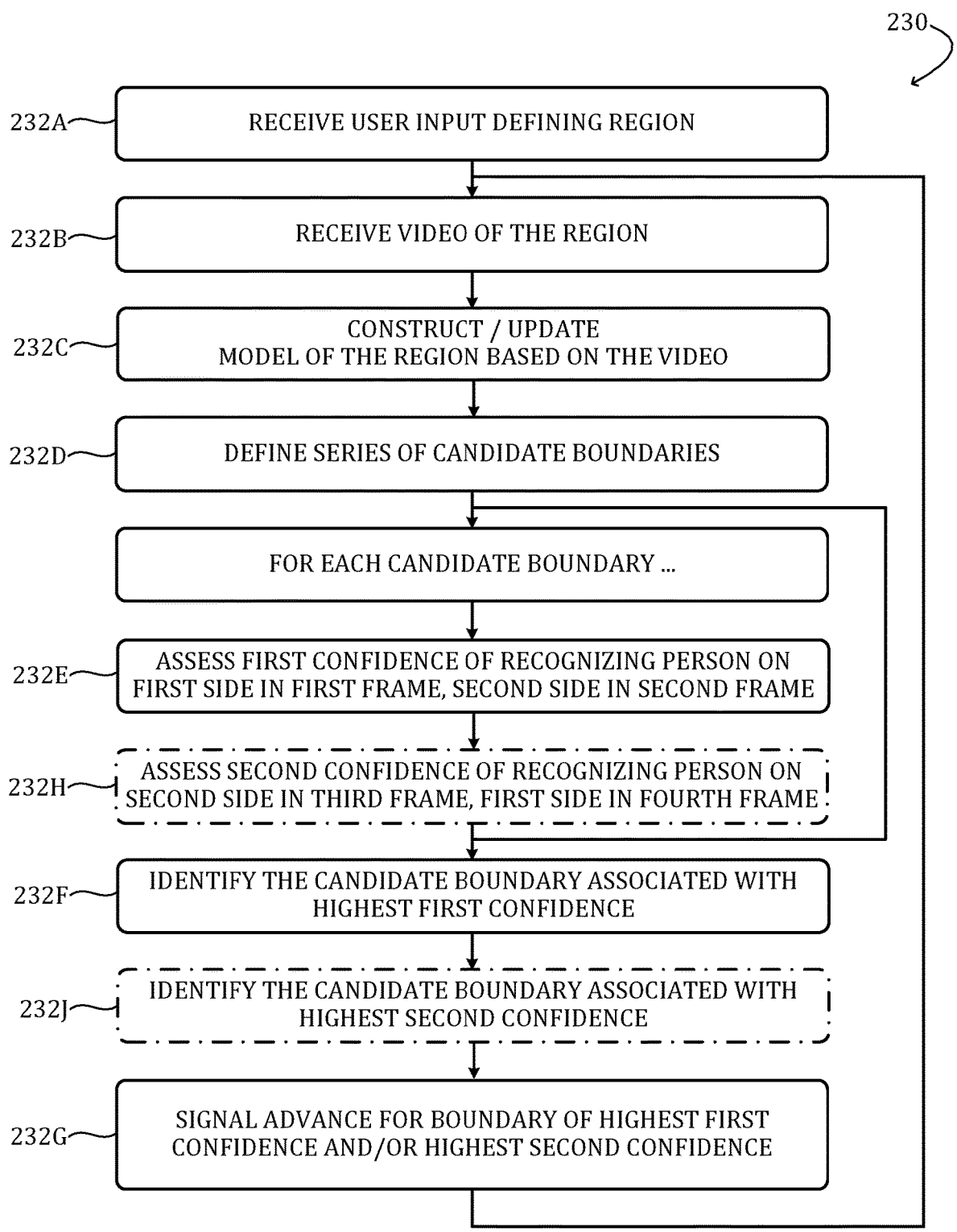
FIG. 2 shows aspects of an example method to detect advance of a person through a region.

In principle, a customer's wait time in a service queue can be estimated by human beings (e.g., employees), via protracted, real-time monitoring of a service environment. That approach, however, may be costly and error-prone. This disclosure provides an automated real-time monitoring solution in which video acquired within a service environment is processed automatically to estimate the wait time for one or more service queues. More specifically, the estimated time interval for traversal of a service queue is proportional to T, an average crossing-time interval between successive crossings of a fixed boundary along the service queue, and to N, the number of persons awaiting service in the geometric region through which the queue extends. In this solution, N is estimated by first detecting all persons within the region and then applying a heuristic filter to recognize the subset of the detected persons that are awaiting service. The filtered subset may also be used in the estimation of T, by tracking the movement of only those persons awaiting service along the service queue. This solution is advantageously insensitive to interference caused by other persons who may be in the general region of the service queue but not awaiting service. It also avoids the computational overhead and associated error of continuously tracking each and every recognized person as they pass through the service queue.

The skilled reader will note that the act of estimating the average crossing-time interval T is itself a complex task. Accordingly, this disclosure also provides a general method to detect the advance of a person through a region. The advance-detection method is well-suited to the task of detecting when any person awaiting service has crossed a fixed boundary along a service queue. In addition to that application, the advance-detection method can be applied to many other problems. Such problems include determining, for any region having discrete entry and/or exit points, the rate of human ingress and/or egress through those points.

Turning now to the drawings, FIG. 1 is a plan view of an example service environment 102. In the illustrated scenario, the service environment includes an entry-or-exit region 104A, a service station 106, a service provider 108, and several other persons 110. In some examples the service environment may be a retail environment, the service stations may be check stands, the service provider may be a cashier, and the other persons may be customers. Non-retail environments are equally contemplated. For example, service environment 102 may be a sports arena, a clinic, a museum, a zoo, a government office, a library or other source of in-person public information, etc.

Service environment 102 includes video cameras 112A and 112B. In other examples, a service environment may include additional video cameras, or only one. Video camera 112A in FIG. 1 is configured to capture a live image of entry-or-exit region 104A of service environment 102. Video camera 112B is configured to capture a live image of service-queue region 104B. The video cameras may be mounted on a ceiling or high on a wall and may be configured to have a wide field-of-view. Each video camera may comprise a color camera, a black-and-white camera, an infrared camera, and/or a depth camera. In the example shown in FIG. 1, service-queue region 104B is a region adjacent to service station 106—an area where persons are liable to be waiting in a service queue.

FIG. 1 also shows a monitor station 114 including a computer system 116. In some examples the monitor station is on the same premises as service environment 102. In other examples the monitoring station may be remote from the service environment. The monitor station can be implemented on a remote server, for example. Video cameras 112 may be coupled communicatively to computer system 116 through any suitable network, such as the Internet or a local-area network.

FIG. 1 shows manager 118, a human being that may interact with computer system 116 to provide input thereto. In some scenarios, the manager may monitor the video feed from service environment 102 for purposes related or unrelated to this disclosure. In the illustrated example, computer system 116 includes user-interface engine 120, hardware interface 122, machine-vision engine 124, detection engine 126, and prediction engine 128. The functionality of the enumerated computer components is described hereinafter with reference to FIGS. 2 and 4; the structure of the computer components is described with reference to FIG. 6.

As noted hereinabove, this disclosure provides a method to predict a traversal-time interval for traversal of a service queue, which relies in part on the ability to detect when a person crosses a fixed, imaginary boundary defined within the service queue. Although various modes of boundary-crossing detection are compatible with this disclosure, it will be helpful to the reader to first appreciate one such mode before absorbing the more involved method of traversal-time prediction.

To that end, FIG. 2 shows aspects of an example method 230 to detect the advance of a person through a region. In some examples, the region through which the person advances is a region of a service environment, such as service environment 102 of FIG. 1. In the particular scenario illustrated below, that region corresponds to entry-or-exit region 104A of service environment 102. Other regions are also envisaged, however, and are used when applying method 230 to traversal-time prediction. Method 230 is executed on a computer system. For ease of illustration, the method is described with reference to the components of computer system 116—viz., user-interface engine 120, hardware interface 122, machine-vision engine 124, and detection engine 126. In other examples, different computer systems may be used.

Figure 3:
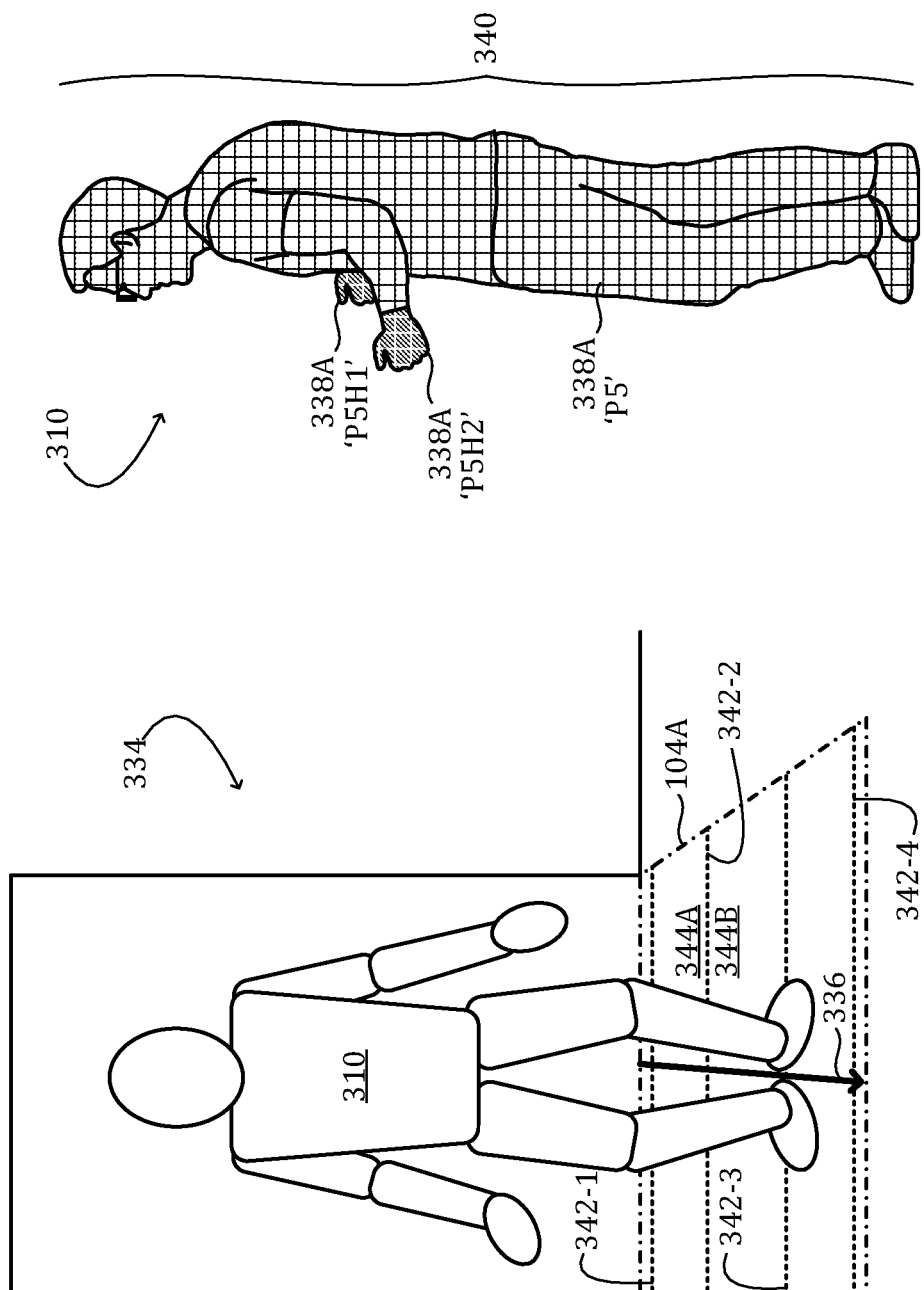
FIG. 3A shows aspects of an example video frame including an entry-or-exit region of a service environment.
FIG. 3B shows aspects of an example model matrix including a segment of pixel elements corresponding to a person.

At 232A of method 230, the user-interface engine of the computer system receives user input defining a geometric region—e.g., a region within a service environment. A convenient way to facilitate the user input is via a graphical user interface (GUI). In some examples, the GUI may present to the user at least one frame of video imaging the service environment. The 'user' in this context may be a proprietor, manager, administrator, or responsible party for the service environment. The video frame is presented on a display screen coupled operatively to a pointing device—e.g., mouse or touch sensor. The pointing device enables the user to draw a graphic over top of the video frame. The user-supplied graphic may include a geometric shape or any combination of lines or other marks that define the region, directly or indirectly. By way of example, FIG. 3A shows video frame 334, as acquired by video camera 112A of FIG. 1 and presented on a display screen. Here the user has drawn an arrow 336 on the user-interface representation of the video frame. The user-interface engine subsequently expands the arrow to define entry-or-exit region 104A. Not only the perimeter of the region is defined in this manner but also a referential direction of advance through the region. In the illustrated example, the direction of the arrow drawn by the user indicates the entry direction into the service environment as opposed to the exit direction. In other examples, the user may simply draw a box defining the perimeter of the region, and the referential direction may be distinguished in some other manner, if necessary. In still other examples, the user may input the perimeter and referential direction in a non-graphical manner.

Returning now to FIG. 2, at 232B of method 230, the hardware interface of the computer system receives video of the region. The video may include a time-sequential series of video frames in any suitable data encoding and/or compression format. Each video frame is a digital image comprising a matrix of pixel elements. Each pixel element i has at least one associated brightness value $b_i$—three brightness values for color video. In examples in which depth video is used, each pixel element i has an associated depth value $r_i$.

At 232C the machine-vision engine of the computer system updates a model of the region based on the video. The model is a digital model held in computer memory of the computer system. The model may include plural data structures that evolve over time as new video is received. One of the evolving data structures is a 2D or 3D matrix of brightness and/or depth values derived from the video frames received at 232B. The model matrix may be populated via geometric coordinate transformation of the video frames, if necessary. In some examples, coordinate transformation may be used to coerce video from different cameras onto the same coordinate system, to convert from 2D to 3D or vice versa, to reverse a fish-eye projection, etc.

A classification machine of the machine-vision engine is used to classify the elements of the model matrix at 232C. More particularly, the classification machine identifies those elements that correspond to persons. To that end, the model matrix is divided into plural segments, with some of the segments recognized as person segments at a confidence level (vide infra) determined by the classification machine. All of the elements within each person segment are labeled as person elements by attachment of an appropriate label. FIG. 3B shows aspects of an example model matrix and illustrates a person 310 recognized in this manner. In the illustrated representation, all of the elements 338 within person segment 340 are assigned person label 'P5', indicating that those elements correspond to a fifth person recognized. In some examples, the classification machine is configured to label certain subsegments within a person segment, which identify parts of the recognized person's body. In FIG. 3B the classification machine has identified the right hand and the left hand of the recognized person. That information can be used to determine the person's orientation within a region, for example.

The algorithms used by the classification machine are not particularly limited. Typically the classification machine is a trained machine—i.e., a computer program configured to receive training data in the form of video frames in which persons and body-part segments are already labeled. By processing a significant amount of training data, internal parameter values of the classification machine are gradually refined, such that when an unlabeled video frame is subsequently provided, the classification machine is able to assign appropriate labels to the elements. Many trained classification machines are configured to return, in addition to each element label i, an estimate for the confidence $c_i$ of assigning that label. The confidence is a statistical measure related to the probability that the label is correct. In some examples, an assigned label may be ignored if the confidence is below a predetermined threshold. In some examples, elements of the model matrix are fit to a skeletal model of a human being to enable the initial classification of person elements and more detailed classification into body-part elements. In some examples, a continuity heuristic may be used to track a person segment through a series of video frames. In some examples, such tracking may be assisted by a facial-recognition algorithm. In other examples, the image classification is extended to include orientation labeling, which also may be used to assist frame-to-frame person tracking.

Returning again to FIG. 2, at 232D the detection engine of the computer system defines in the model a series of candidate boundaries within the region. The candidate boundaries are arranged at different locations within the region. FIG. 3A shows a non-limiting series of candidate boundaries 342 defined within region 104A. In this example, the series of candidate boundaries are mutually parallel, offset from each other, and span the region. Each of the candidate boundaries in FIG. 3A is also perpendicular to arrow 336, which extends through the region in the referential direction—i.e., a direction in which at least some persons are expected to advance through the region. Through other regions, a person's path of advance may not necessarily conform to a straight line; in that case each of the candidate boundaries may be perpendicular to the tangent to the path of advance (vide infra), which is liable to change orientation as a function of progress along the path.

The purpose of defining and testing a series of candidate boundaries for detection of the same advance event is the following. Although a single, fixed boundary could be defined according to a rule, or based on the experience of an administrator, a boundary defined in that manner may not be positioned optimally to detect advance through the region under varying conditions. Such varying conditions include video-camera placement, lighting, physical occlusions within the region, and even the type of clothing worn by the imaged persons in warmer versus cooler seasons. Thus, candidate boundary 342-2 of FIG. 3A may be optimal for one set of conditions, and candidate boundary 342-3 may be optimal for a different set of conditions.

Continuing in FIG. 2, at 232E in method 230, a control loop is encountered. For each candidate boundary i in the series of candidate boundaries, the detection engine assesses the confidence of recognizing a person on a first side of the candidate boundary in a first frame of the video and on a second, opposite side of the candidate boundary in a second, subsequent frame of the video. It will be noted that the term 'subsequent frame' neither requires nor excludes the very next frame. The skilled reader will understand that the confidence for a complex event can be expressed as a sum of confidences for each mutually exclusive way that an event can happen, and that the confidence for each mutually exclusive way can be expressed as the product of confidence of every subevent required for that way. In that manner, confidence for a complex event can be expressed in terms of the label confidences $c_i$ introduced above. By way of example, FIG. 3A distinguishes the first side 344A of candidate boundary 342-2 from second side 344B of the same candidate boundary. Herein this confidence estimate is called the 'first confidence' $C_{i+}$; it corresponds to the confidence that a person has crossed the corresponding candidate boundary i in a first direction—e.g., the entry direction, the right-to-left direction, etc.

A person may be recognized on the first or second side of a candidate boundary via any suitable machine-vision strategy. In one example, the detection engine of the computer system compares the centroid position of the person segment to the position of each candidate boundary in first and second frames of the video. The confidence for recognizing the person on the first side of candidate boundary i in a first video frame is $C_{11i}$, and the confidence for recognizing the person on the second side of the candidate boundary in a second frame is $C_{22i}$. Accordingly, first confidence $C_{i+}$ may be estimated as the product $C_{11i} C_{22i}$ in some examples.

At 232F the candidate boundary associated with the highest first confidence, $C_+$, is identified. In some examples, this determination is made based on a plurality of crossings of the series of candidate boundaries—e.g., by different persons. In other words, each first confidence $C_{i+}$ may be averaged over a predetermined period of time or number of crossings. In some examples a running average may be employed. In other examples, confidences may be predetermined during a dedicated 'training' phase. In still other examples, the determination may be made afresh for each person crossing. Subsequently, the detection engine will signal the advance of a person through the region in a first direction pursuant to recognizing that $C_+$ exceeds a predetermined confidence threshold. At 232G, accordingly, the detection engine signals advance through the region in the first direction pursuant to recognizing, above the threshold confidence, that the person is on the first side of the identified candidate boundary in the first frame of the video and on the second side of the identified candidate boundary in the second frame of the video. The advance may be signaled electronically by the computer system enacting the method—signaled digitally, for example, by setting a flag, modifying a variable, raising an interrupt, etc.

The action above corresponds to detecting advance through the region in the first direction. For some applications, however, it is useful to detect advance through the region in opposing first and second directions. To that end, method 230 includes optional step 232H, where the detection engine assesses a confidence of recognizing a person on the second side of the candidate boundary in a third frame of the video and on the first side of the candidate boundary in a fourth, subsequent frame of the video. Herein this confidence estimate is called the 'second confidence' $C_{i-}$; it corresponds to the confidence that a person has crossed the corresponding candidate boundary in a second direction— e.g., the exit direction or the left-to-right direction. In some examples, the detection engine may compare the centroid position of the person segment to the position of the candidate boundary in third and fourth frames of the video. The confidence for recognizing the person on the second side of the boundary in the third frame is $C_{23i}$, and the confidence for recognizing the person on the first side of the boundary in the fourth frame is $C_{14i}$. Accordingly, second confidence $C_{i-}$ may be estimated as the product $C_{23i}$ $C_{14i}$ in some examples.

Optionally at 232J, the candidate boundary associated with the highest second confidence, $C_{i-}$, is identified. The detection engine signals advance of a person through the region in the second direction pursuant to recognizing that $C_{i-}$ exceeds a predetermined confidence threshold. At 232G, accordingly, the detection engine signals advance through the region in the second direction pursuant to recognizing, above the threshold confidence, that the person is on the second side of the identified candidate boundary in the third frame of the video and on the first side of the identified candidate boundary in the fourth frame of the video. Because the candidate boundaries are optimized separately for crossing the region in opposite directions, it is possible that the candidate boundary of highest second confidence may differ from the candidate boundary of highest first confidence. In other words, the system may use different candidate boundaries for detection of travel in different (e.g., opposite) directions. This example scenario is represented in FIG. 3A, where candidate boundary 342-3 is the boundary that defines person crossing in the direction of arrow 336, and candidate boundary 342-2 is the boundary that defines person crossing in the direction opposite arrow 336.

Figure 4:
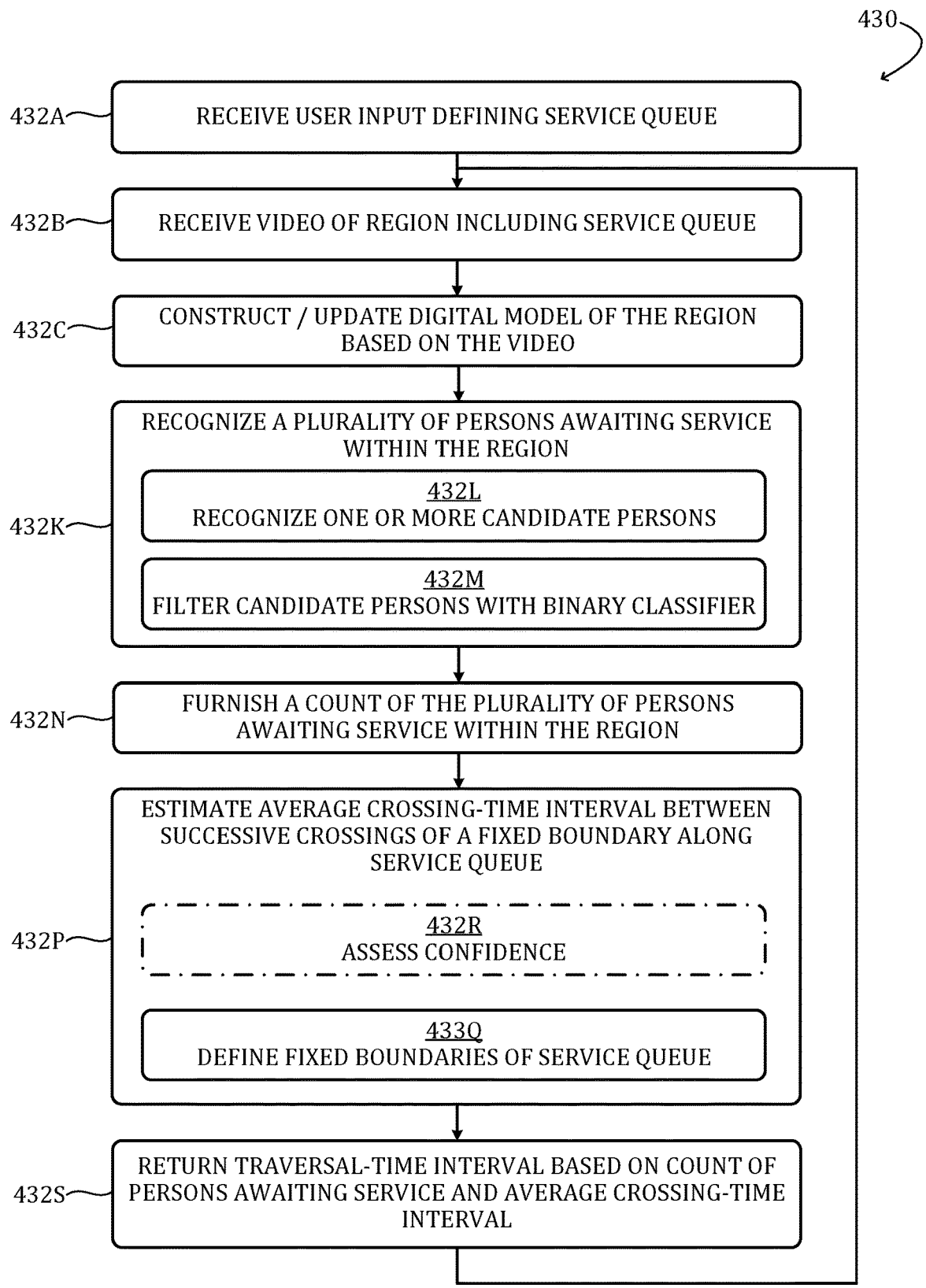
FIG. 4 shows aspects of an example method to predict a traversal-time interval for traversal of a service queue.

FIG. 4 shows aspects of an example method 430 to predict a traversal-time interval for traversal of a service queue. The service queue extends through a region of a service environment, such as service environment 102 of FIG. 1. Method 430 is executed on a computer system. For ease of illustration, the method is described with reference to the components of computer system 116 of FIG. 1—viz., user-interface engine 120, hardware interface 122, machine-vision engine 124, detection engine 126, and prediction engine 128. In other examples, different computer systems may be used.

Figure 5A:
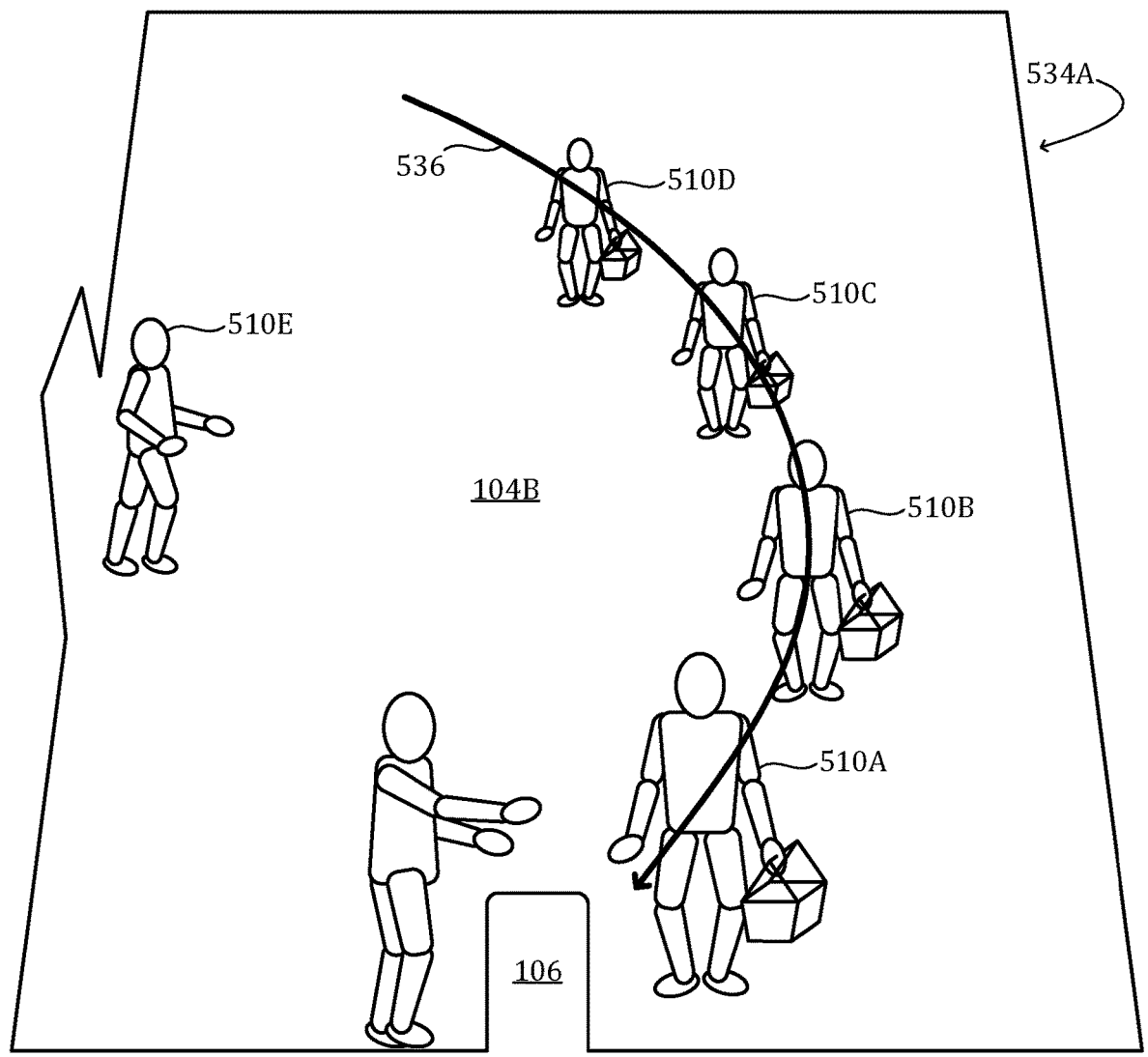
FIGS. 5A through 5C show aspects of filtering a recognized person to determine whether that person is awaiting service in an example service queue.

At 432A of method 430, the user-interface engine of the computer system receives user input defining the service queue. In some examples the path and direction of the service queue are defined by the user. As noted hereinabove, a convenient way to facilitate the user input is via a GUI that presents to the user at least one frame of video imaging the service environment. The video frame is presented on a display screen coupled operatively to a pointing device—e.g., mouse or touch sensor. The pointing device enables the user to draw a graphic over top of the video frame. The user-supplied graphic may include a curved or straight line with an indication of flow direction. By way of example, FIG. 5A shows video frame 534A, as acquired by video camera 112B of FIG. 1 and presented on a display screen. Here the user has drawn a curved arrow 536 on the user-interface representation of the video frame. The curved arrow indicates both the path and the flow direction of the service queue. To facilitate comparison between coordinates of the service queue and those of the model matrix, the service queue is mapped by appropriate coordinate transformation onto the coordinate system of the model matrix.

Returning now to FIG. 4, at 432B of method 430, the hardware interface of the computer system receives video of the region including the service queue. At 432C the machine-vision engine of the computer system updates the model of the region based on the video. In some examples, the video and the model may be substantially the same as described hereinabove, in the context of FIG. 2.

At 432K the prediction engine of the computer system recognizes, based on the video, a plurality of persons awaiting service within the region. The term 'recognize', when applied herein to a person, does not necessarily mean that the actual identity of the person be determined. Rather, it means that the system recognize a segment as corresponding to a person awaiting service if it does correspond to a person awaiting service. This feature may be enacted via a classification machine, as described above, or via any other suitable person-identification algorithm. In some instances the prediction engine also distinguishes a segment corresponding to one person from a segment corresponding to another person, still without determining the actual identity of either person.

Continuing in FIG. 4, the act of recognizing the plurality of persons awaiting service within the region includes, at 432L, using machine vision to recognize a superset of candidate persons within the region, irrespective of the activity of the persons recognized. Person recognition is enacted as described hereinabove in the context of method 230. At 432M the superset of candidate persons are filtered by application of a binary classifier, which distinguishes those persons waiting in the service queue. The term 'binary classifier' is used herein to specify a particular function of prediction engine 128 that, for any person segment, distinguishes whether the corresponding person is (case 1) awaiting service in a service queue, or (case 0) not awaiting service in a service queue, and optionally assigns a confidence to that binary determination. In some examples, the binary classifier may be one component in an overall, greater than binary classification scheme.

In some examples, the superset of candidate persons are filtered based on proximity to the service queue. Persons relatively close to the service queue are recognized as persons awaiting service, while persons relatively far from the service queue are not. In the example shown in FIG. 5B, the prediction engine of the computer system identifies person 510B as a person awaiting service because person 510B is within a threshold distance of service queue 546. The prediction engine of the computer system does not identify person 510C as a person awaiting service because person 510C is standing outside of the threshold distance. The threshold distance may be set to any suitable value—e.g., 150 centimeters.

Figure 5B:
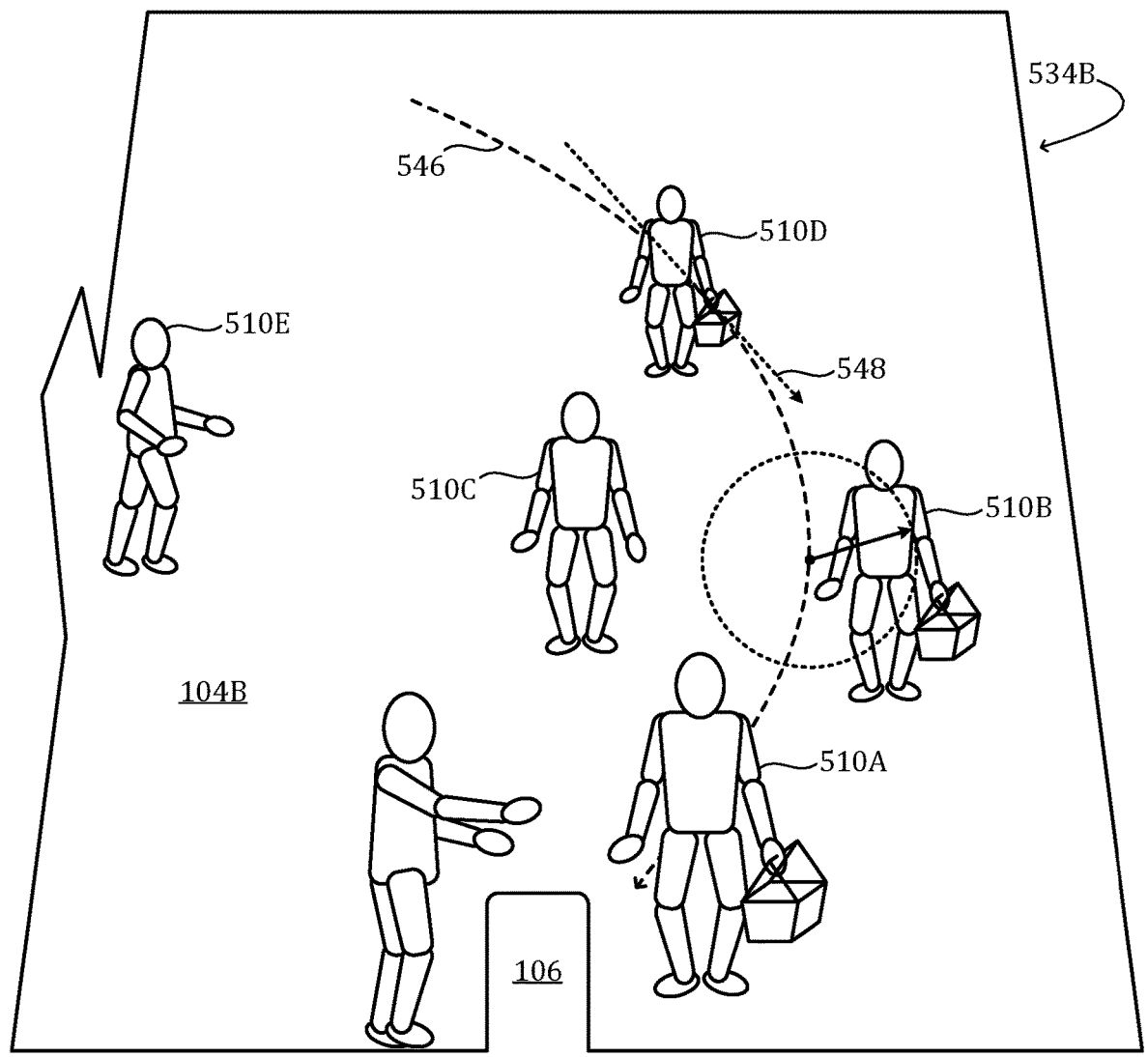

In some examples, the superset of candidate persons are filtered based on orientation and/or posture relative to the flow direction of the service queue. This is a heuristic determination based on the idea that persons waiting in a service queue are likely to be standing up and facing the flow direction of the service queue. As shown in FIG. 5B, the prediction engine of the computer system identifies person 510D as a person awaiting service because the facing direction of person 510D is approximately parallel to the tangent 548 of the service queue and parallel also to the local flow direction of the service queue at the point of tangency. The prediction engine of the computer system does not identify person 510E as a person awaiting service because person 510E is facing a different direction. Naturally, the facing direction of a person need not be perfectly aligned to the tangent of the service queue in order for that person to be recognized as a person awaiting service. In some examples, the prediction engine may recognize standing persons oriented within a finite range of angles centered on the direction of the tangent.

Figure 5C:
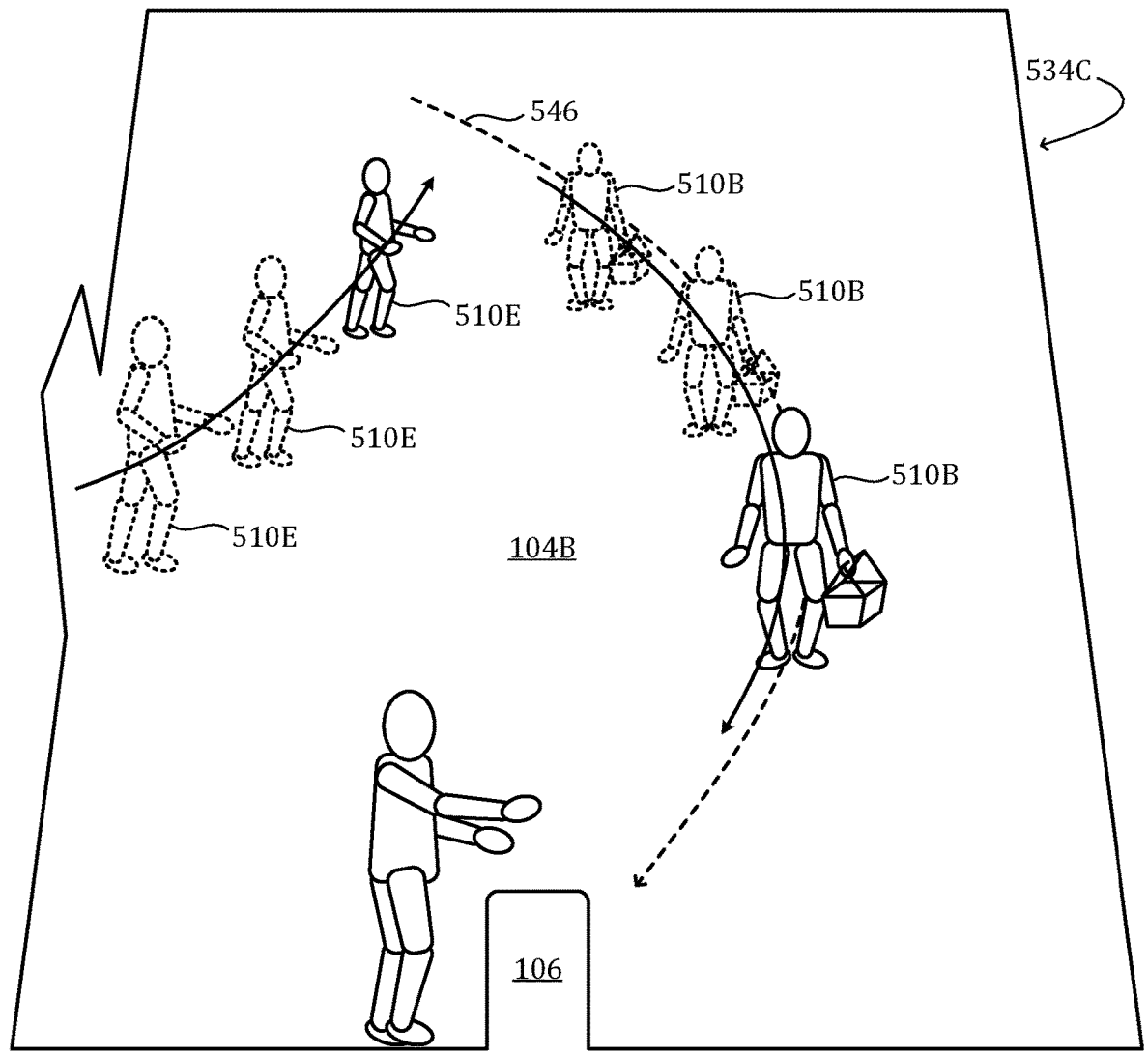

In some examples, the superset of candidate persons are filtered based on direction of movement relative to the local flow direction of the service queue. The intention here is to exclude persons who may be resting, browsing, or wandering about in the region through which the service queue extends. In the example shown in FIG. 5C, the prediction engine of the computer system identifies person 510B as a person awaiting service because person 510B is moving parallel to the tangent of the service queue and parallel also to the local flow direction of the service queue at the point of tangency. The prediction engine of the computer system does not identify person 510E as a person awaiting service because person 510E is moving off in a different direction. In some examples, the superset of candidate persons are filtered based on velocity-either absolute velocity or velocity relative to the estimated flow rate of the service queue. For instance, a person moving very fast or moving much faster or much slower than the estimated flow rate of the service queue may be excluded by the filter and not identified as a person awaiting service. More complex filters based on combinations of the above heuristics are also envisaged. For example, as the angle of separation between a person's velocity and the service-queue tangent grows larger, the threshold speed for excluding that person may be reduced.

The detailed algorithm for filtering observed persons to recognize persons awaiting service is not particularly limited. In some examples the prediction engine evaluates a dedicated classifier for any, some, or all of the above criteria used in a given implementation—e.g., a first classifier for proximity to the queue, a second classifier for orientation/posture, a third classifier for direction of movement, etc. Each of the dedicated classifiers may return a confidence for recognizing a given person segment as belonging to a person awaiting service. The confidence outputs from the respective, dedicated classifiers may be provided as inputs to a meta-classifier that returns the desired binary classification. In some examples, the binary classifier may comprise only deterministic logic. In other examples, the binary classifier may comprise a trained machine, such as an artificial neural network. In one, non-limiting example, a trained machine may be trained to recognize more than one of the above criteria concurrently.

Figure 5D:
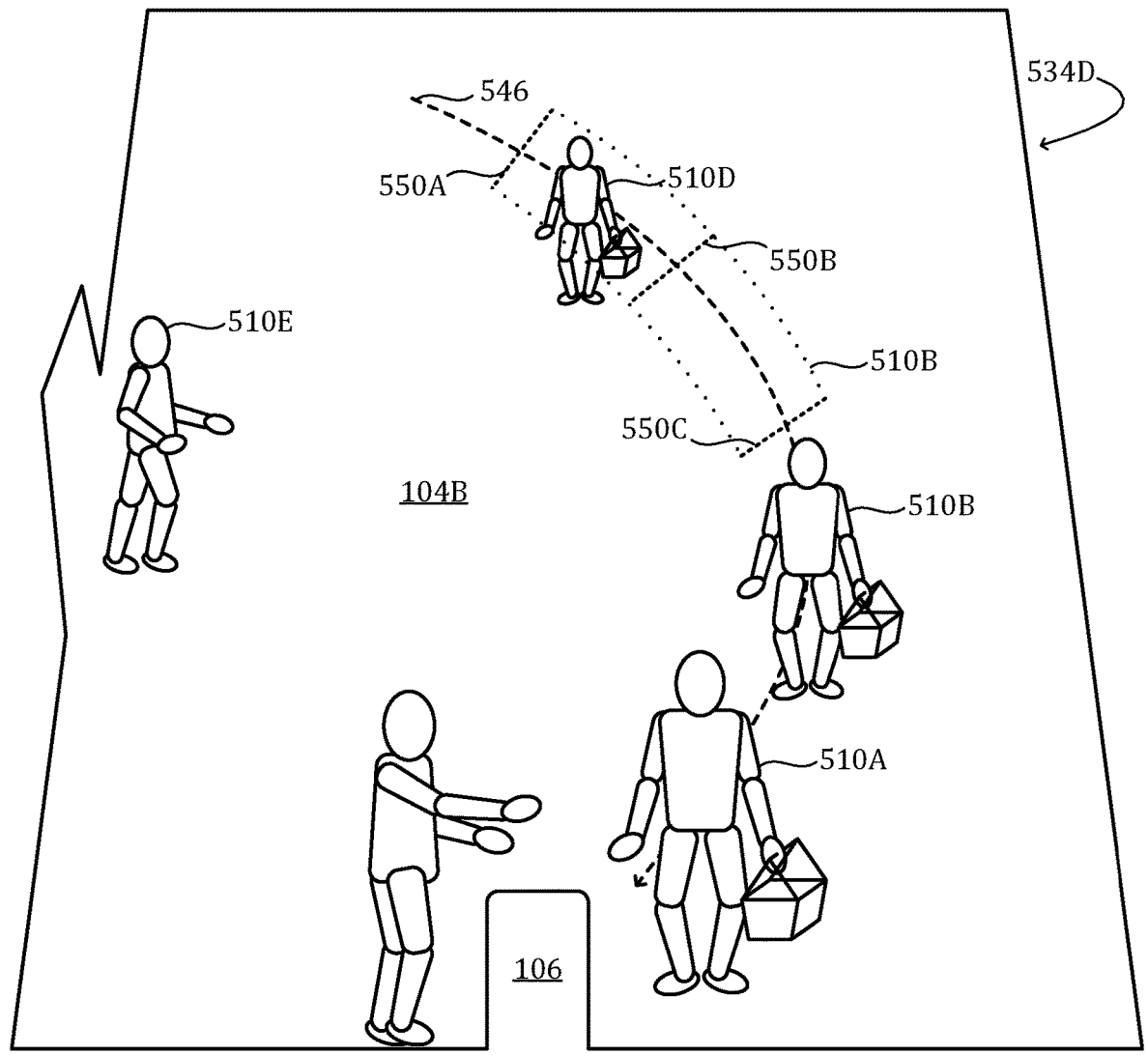
FIG. 5D shows aspects of an example service queue with fixed boundaries for estimating an average crossing-time interval.

At 432N the prediction engine of the computer system furnishes a count of the plurality of persons awaiting service within the region. The count may be furnished based on any, some, or all of the recognition strategies hereinabove. At 432P the prediction engine estimates the average crossing-time interval between successive crossings of a fixed boundary along the service queue. The estimation is enacted based on features of the service queue and of the plurality of persons awaiting service. More particularly, at 432Q the prediction engine of the computer system defines one or more fixed boundaries. Typically, each of the fixed boundaries takes the form of a plane perpendicular to the tangent of the service queue. As shown in FIG. 5D, a series of fixed boundaries 550 may be spaced apart along the service queue. In principle the fixed boundaries can be placed anywhere along the service queue. As noted in the context of method 230, however, it is advantageous to arrange the fixed boundaries where the confidence for person recognition or crossing recognition is highest.

In some examples, the user may specify where within the service environment to arrange the fixed boundaries. User input to that effect may be provided at 432A, for example, along with the user input that defines the service queue. Alternatively, the prediction engine may assign the fixed-boundary positions automatically, based on confidence of person recognition or crossing recognition. At optional step 432R, accordingly, the prediction engine assesses confidence for person recognition or crossing recognition at different locations within the region. In some examples, the assessed confidence may be substantially the same as the highest first confidence $C_{i+}$ assessed in method 230. Thus, step 432R may be tantamount to executing method 230 on a nested region corresponding to the service queue. In other examples, the assessed confidence may differ from $C_{i+}$, in that it applies only to recognition of those persons classified (at 432K of FIG. 4) as persons awaiting service. In examples in which any of the above strategies are employed, defining the one or more the fixed boundaries at 432Q includes arranging the one or more the fixed boundaries along the service queue based on the confidence as assessed. Moreover, although the term 'fixed boundary' is used herein, it will be understood that the position of any boundary may be adjusted automatically during the execution of method 430—e.g., pursuant to changes in confidence values—in order to maintain or increase the accuracy of person-crossing detection.

Irrespective of the detailed manner in which the fixed boundaries are defined, the average crossing-time interval T can be estimated based on the number of persons n>1 (e.g., persons awaiting service) crossing a given fixed boundary over a fixed, arbitrary time interval t. In some examples, T=t/n, such that a single fixed boundary is sufficient for estimation of the average crossing-time interval. Alternatively, an average crossing-time interval may be estimated separately as the interval between successive crossings of any, some, or all of the fixed boundaries defined at 432Q; the respective estimates may be averaged together to yield the operational average crossing-time interval. In this approach, each of the respective estimates is an average over the plurality of persons crossing a given fixed boundary, and the operational value is further averaged over a plurality of fixed boundaries. This approach offers protection from unpredictable sources of error in person recognition at particular points along the service queue.

Significantly, estimation of the average crossing-time interval at 423P of method 430 does not necessarily require frame-to-frame tracking of the model-element segment of each person awaiting service. This aspect significantly reduces the computational overhead of method 430 relative to methods that require every recognized person in the region of the service queue to be tracked. It also avoids flow-rate errors that may arise from discontinuities in person tracking.

At 432S the prediction engine returns an estimate of the traversal-time interval based on a count of the persons awaiting service and on the average crossing-time interval as estimated. In some examples, the estimate is obtained by multiplying the estimated count by the estimated average crossing-time interval.

No aspect of the foregoing drawings or description should be understood in a limiting sense, as numerous variations, extensions, and omissions are also envisaged. For instance, the description above makes reference to a machine trained to recognize features in a first video frame and in a second, subsequent video frame. However, some machines may be trained to process sets of consecutive frames concurrently, so as to resolve dynamic features. For such machines, the 'first video frame' may be a frame belonging to a first set, and the 'second, subsequent video frame' may be a frame belonging to a second, subsequent set.

Although FIG. 1 shows only one video camera and service queue, the methods herein are extensible to additional video cameras and service queues. In some examples, video may be received from a plurality of video cameras arranged above a region, such video cameras having different fields-of-view. In that case, the methods illustrated in FIGS. 2 and 4 may be extended to include an extra step of co-registering video from each of the plurality of video cameras. Likewise, service queue 146 of FIG. 1 may correspond to one of a plurality of service queues imaged by the same video camera or cameras, and the methods here illustrated may be applied to predicting the traversal-time interval for traversal of any, some, or all of the service queues imaged.

Although the machine-vision implementations herein focus on recognizing the actual bodies of persons, machine vision can also be used to recognize a vehicle carrying one or more persons awaiting service. Thus, the methods herein are naturally extensible to monitoring vehicular service queues—e.g., queues of cars on a highway or airplanes on a tarmac.

The methods herein may be tied to a computer system of one or more computing devices. Such methods and processes may be implemented as an application program or service, an application programming interface (API), a library, and/or other computer-program product.

Figure 6:
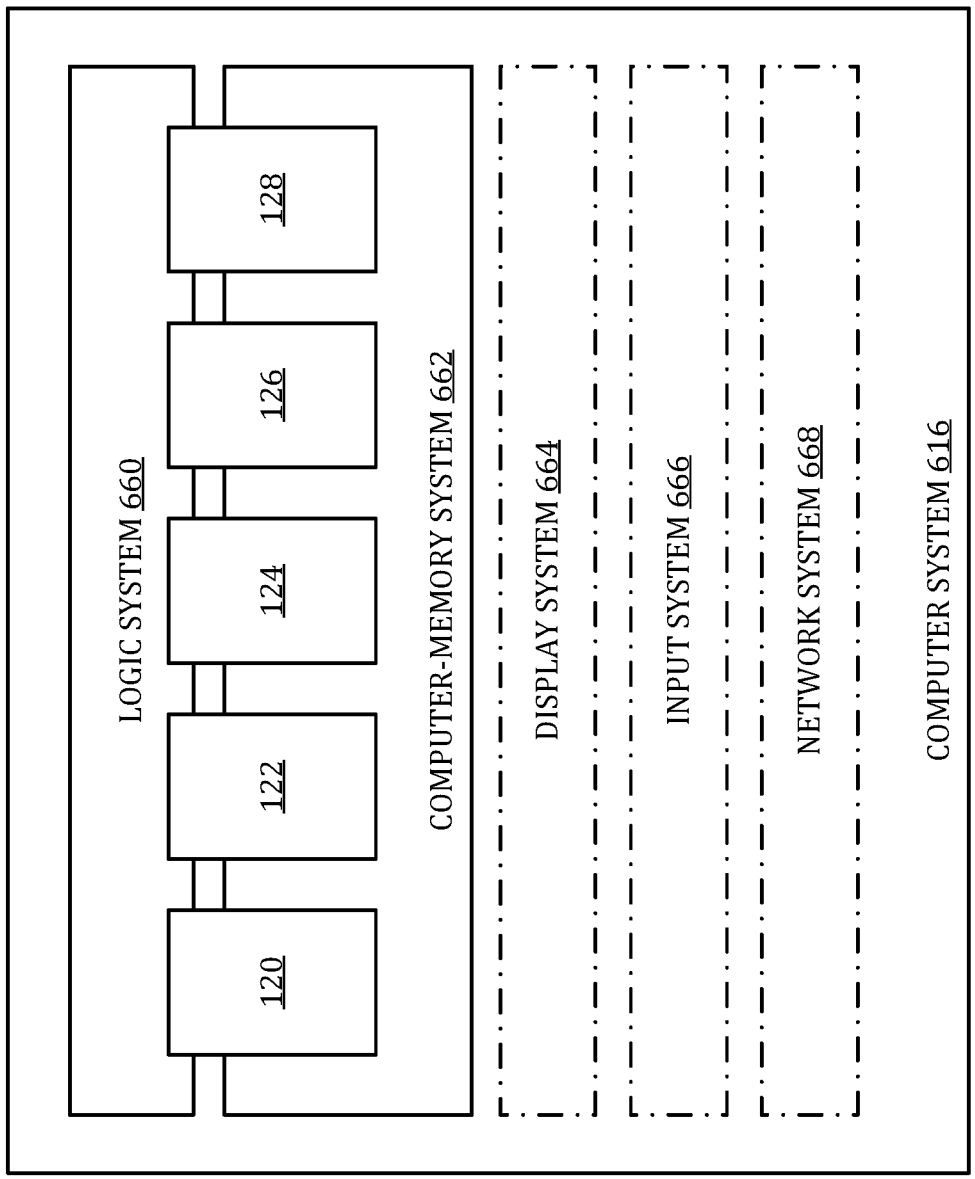
FIG. 6 shows aspects of an example computer system.

FIG. 6 provides a schematic representation of a computer system 616 configured to provide some or all of the computer system functionality disclosed herein. Computer system 616 may take the form of a personal computer, application-server computer, or any other computing device.

Computer system 616 includes a logic system 660 and a computer-memory system 662. Computer system 616 may optionally include a display system 664, an input system 666, a network system 668, and/or other systems not shown in the drawings.

Logic system 660 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 662 includes at least one physical device configured to temporarily and/or permanently hold computer system information, such as data and instructions executable by logic system 660. When the computer-memory system includes two or more devices, the devices may be collocated or remotely located. Computer-memory system 662 may include at least one volatile, nonvolatile, dynamic, static, read/write, read-only, random-access, sequential-access, location-addressable, file-addressable, and/or content-addressable computer-memory device. Computer-memory system 662 may include at least one removable and/or built-in computer-memory device.

When the logic system executes instructions, the state of computer-memory system 662 may be transformed—e.g., to hold different data.

Aspects of logic system 660 and computer-memory system 662 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 660 and computer-memory system 662 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 164 may be used to present a visual representation of data held by computer-memory system 662. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 666 may comprise or interface with one or more input devices. An input device may include a sensor device or a user input device. Examples of user input devices include a keyboard, mouse, or touch screen.

When included, network system 668 may be configured to communicatively couple computer system 616 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a computer-implemented method to predict a traversal-time interval for traversal of a service queue. The method comprises: receiving video of a region including the service queue; recognizing in the video, via machine vision, a plurality of persons awaiting service within the region; estimating an average crossing-time interval between successive crossings, by the plurality of persons, of a fixed boundary along the service queue, wherein such estimating is based on features of the service queue and of the plurality of persons awaiting service; and returning an estimate of the traversal-time interval based on a count of the plurality of persons awaiting service and on the average crossing-time interval as estimated.

In some implementations, returning the estimate of the traversal-time interval includes multiplying the count by the average crossing-time interval as estimated. In some implementations, the method further comprises receiving graphical user input defining the service queue in at least one frame of the video. In some implementations, recognizing the plurality of persons awaiting service includes using machine vision to recognize a superset of candidate persons within the region and filtering the superset of candidate persons by application of a binary classifier. In some implementations, filtering the superset of candidate persons includes filtering based on proximity of each of the candidate persons to the service queue. In some implementations, filtering the superset of candidate persons includes filtering based on orientation and/or posture of each of the candidate persons relative to a flow direction of the service queue. In some implementations, filtering the superset of candidate persons includes filtering based on velocity of each of the candidate persons. In some implementations, filtering the superset of candidate persons includes filtering based on direction of movement of each of the candidate persons relative to a predetermined local flow direction of the service queue. In some implementations, estimating the average crossing-time interval includes defining one or more fixed boundaries perpendicular to a tangent of the service queue. In some implementations, the method further comprises assessing confidence for recognizing the plurality of persons awaiting service at different locations within the region, wherein defining the one or more fixed boundaries includes arranging the one or more fixed boundaries along the service queue based on the confidence as assessed. In some implementations, the average crossing-time interval is an interval between successive crossings averaged over at least two of the one or more fixed boundaries. In some implementations, the video is received from a plurality of video cameras arranged above the region and having different fields-of-view, the method further comprising co-registering video from each of the plurality of video cameras. In some implementations, the service queue is a first service queue, the video of the region also includes a second service queue, and the method is also applied to predicting a traversal-time interval for traversal of the second service queue.

Another aspect of this disclosure is directed to a computer-implemented method to detect advance of a person through a region. The method comprises: receiving video of the region; updating a model of the region in computer memory based on the video; defining in the model a series of candidate boundaries within the region; for each candidate boundary of the series, assessing a confidence of recognizing the person on a first side of the candidate boundary in a first frame of the video and on a second, opposite side of the candidate boundary in a second, subsequent frame of the video; identifying the candidate boundary for which the confidence is highest; and signaling the advance pursuant to recognizing, above a threshold confidence, that the person is on the first side of the identified candidate boundary in the first frame of the video and on the second side of the identified candidate boundary in the second frame of the video.

In some implementations, recognizing the person on the first or second side of the candidate boundary includes recognizing via machine vision. In some implementations, the person is a first person and the confidence is a first confidence, the method further comprising: for each candidate boundary of the series, assessing a second confidence of recognizing a second person on the second side of the candidate boundary in a third frame of the video and on the first side of the candidate boundary in a fourth, subsequent frame of the video; identifying the candidate boundary for which the second confidence is highest; and signaling the advance pursuant to recognizing, above the threshold confidence, that the person is on the first side of the identified candidate boundary in the third frame of the video and on the second side of the identified candidate boundary in the fourth frame of the video. Here the candidate boundary of highest second confidence differs from the candidate boundary of highest first confidence. In some implementations, the series of candidate boundaries are mutually parallel, offset from each other, and span the region. In some implementations, the method further comprises receiving graphical user input defining the region in at least one frame of the video.

Another aspect of this disclosure is directed to a computer system comprising a hardware interface, a machine-vision engine, and a detection engine. The hardware interface is configured to receive video of a region. The machine-vision engine is configured to update a model of the region in computer memory based on the video. The detection engine is configured to: define a series of candidate boundaries within the region; for each candidate boundary of the series, assess a confidence of recognizing a person on a first side of the candidate boundary in a first frame of the video and on a second, opposite side of the candidate boundary in a second, subsequent frame of the video; identify the candidate boundary for which the confidence is highest; and signal advance of the person across the region pursuant to recognizing, above a threshold confidence, that the person is on the first side of the identified candidate boundary in the first frame of the video and on the second side of the identified candidate boundary in the second frame of the video.

In some implementations, the person is among a plurality of persons awaiting service in a service queue within the region, the computer system further comprising a prediction engine configured to: furnish a count of the plurality of persons awaiting service within the region based on recognizing the plurality of persons awaiting service; estimate an average crossing-time interval between successive crossings, by the plurality of persons, of a fixed boundary along the service queue, wherein such estimating is based on features of the service queue and of the plurality of persons awaiting service; and return the traversal-time interval based on the count of the persons awaiting service and on the average crossing-time interval as estimated.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method to predict a traversal-time interval for traversal of a service queue, the method comprising:
   receiving video of a region including the service queue in a hardware interface of a computer system, the video comprising a time-sequential series of digital images each comprising a matrix of pixel elements, wherein each pixel element comprises at least one associated brightness or depth value;
   recognizing in the video, via a machine-vision engine of the computer system, a plurality of persons awaiting service within the region, the machine-vision engine being configured to update a digital model of the region including plural data structures held in computer memory that evolve over time as new video is received, the machine-vision engine including a classification machine configured to divide the digital model into plural segments, identify those segments that correspond to persons above a pre-determined confidence level, and label each person segment;
   estimating, via a prediction engine of the computer system, based on features of the service queue and of the plurality of persons awaiting service, an average crossing-time interval between successive crossings of two or more fixed boundaries within the service queue by the plurality of persons, each of the two or more fixed boundaries having first and second sides where a person waiting in the service queue is recognizable by the machine vision system, wherein the average crossing-time interval is an interval between successive crossings averaged over the two or more fixed boundaries, and wherein the prediction engine is configured to enact a binary classification scheme distinguishing a person awaiting service from a person not awaiting service; and
   returning, via the prediction engine of the computer system, an estimate of the traversal-time interval based on a count of the plurality of persons awaiting service and on the average crossing-time interval as estimated.

2. The method of claim 1 wherein returning the estimate of the traversal-time interval includes multiplying the count by the average crossing-time interval as estimated.

3. The method of claim 1 further comprising receiving graphical user input defining the service queue in at least one frame of the video.

4. The method of claim 1 wherein recognizing the plurality of persons awaiting service includes using machine vision to recognize a superset of candidate persons within the region and filtering the superset of candidate persons by application of a binary classifier.

5. The method of claim 4 wherein filtering the superset of candidate persons includes filtering based on proximity of each of the candidate persons to the service queue.

6. The method of claim 4 wherein filtering the superset of candidate persons includes filtering based on orientation and/or posture of each of the candidate persons relative to a flow direction of the service queue.

7. The method of claim 4 wherein filtering the superset of candidate persons includes filtering based on velocity of each of the candidate persons.

8. The method of claim 4 wherein filtering the superset of candidate persons includes filtering based on direction of movement of each of the candidate persons relative to a predetermined local flow direction of the service queue.

9. The method of claim 1 wherein estimating the average crossing-time interval includes defining one or more fixed boundaries perpendicular to a tangent of the service queue.

10. The method of claim 9 further comprising assessing confidence for recognizing the plurality of persons awaiting service at different locations within the region, wherein defining the two or more fixed boundaries includes arranging the two or more fixed boundaries along the service queue based on the confidence as assessed.

11. The method of claim 1 wherein the video is received from a plurality of video cameras arranged above the region and having different fields-of-view, the method further comprising co-registering video from each of the plurality of video cameras.

12. The method of claim 1 wherein the service queue is a first service queue, wherein the video of the region also includes a second service queue, and wherein the method is also applied to predicting a traversal-time interval for traversal of the second service queue.

13. A computer system comprising:
   a hardware interface configured to receive video of a region;
   a machine-vision engine configured to update a model of the region in computer memory based on the video;
   a detection engine configured to:
      define a series of candidate boundaries within the region;
      for each candidate boundary of the series, assess a confidence of recognizing a person on a first side of the candidate boundary in a first frame of the video and on a second, opposite side of the candidate boundary in a second, subsequent frame of the video, wherein the person is among a plurality of persons awaiting service in a service queue within the region;
      identify the candidate boundary for which the confidence is highest; and
   signal advance of the person across the region pursuant to recognizing, above a threshold confidence, that the person is on the first side of the identified candidate boundary in the first frame of the video and on the second side of the identified candidate boundary in the second frame of the video; and
   a prediction engine configured to:

furnish a count of the plurality of persons awaiting service within the region based on recognizing the plurality of persons awaiting service;

estimate an average crossing-time interval between successive crossings, by the plurality of persons, of a fixed boundary along the service queue, wherein such estimating is based on features of the service queue and of the plurality of persons awaiting service; and return a traversal-time interval based on the count of the plurality of persons awaiting service and on the average crossing-time interval as estimated.

14. A computer-implemented method to predict a traversal-time interval for traversal of a service queue, the method comprising:

receiving video of a region including the service queue in a hardware interface of a computer system, the video comprising a time-sequential series of digital images each comprising a matrix of pixel elements, wherein each pixel element comprises at least one associated brightness or depth value;

recognizing in the video, via a machine-vision engine of the computer system, a plurality of persons awaiting service within the region, the machine-vision engine being configured to update a digital model of the region including plural data structures held in computer memory that evolve over time as new video is received, the machine-vision engine including a classification machine configured to divide the digital model into plural segments, identify those segments that correspond to persons above a pre-determined confidence level, and label each person segment;

estimating, via a prediction engine of the computer system, based on features of the service queue and of the plurality of persons awaiting service, an average crossing-time interval between successive crossings of a fixed boundary within the service queue by the plurality of persons, the fixed boundary having first and second sides where a person waiting in the service queue is recognizable by the machine vision system, the prediction engine being configured to enact a binary classification scheme distinguishing a person awaiting service from a person not awaiting service; and returning, via the prediction engine of the computer system, an estimate of the traversal-time interval based on a count of the plurality of persons awaiting service and on the average crossing-time interval as estimated, wherein recognizing the plurality of persons awaiting service includes using machine vision to recognize a superset of candidate persons within the region and filtering the superset of candidate persons by application of a binary classifier, wherein filtering the superset of candidate persons includes filtering based on orientation and/or posture of each of the candidate persons relative to a flow direction of the service queue.

15. The method of claim 14 wherein returning the estimate of the traversal-time interval includes multiplying the count by the average crossing-time interval as estimated.

16. The method of claim 14 further comprising receiving graphical user input defining the service queue in at least one frame of the video.

17. The method of claim 14 wherein recognizing the plurality of persons awaiting service includes using machine vision to recognize the superset of candidate persons within the region and filtering the superset of candidate persons by application of the binary classifier.

18. The method of claim 17 wherein filtering the superset of candidate persons includes filtering based on proximity of each of the candidate persons to the service queue.

19. The method of claim 17 wherein filtering the superset of candidate persons includes filtering based on velocity of each of the candidate persons.

* * * * *